United States Patent [19]

Hon

[11] Patent Number: 5,288,772
[45] Date of Patent: Feb. 22, 1994

[54] PRE-TREATED CELLULOSIC MATERIALS FOR PRODUCING MOLDED COMPOSITE ARTICLES THEREFROM AND PROCESS

[75] Inventor: David N.-S. Hon, Clemson, S.C.

[73] Assignee: Clemson University, Clemson, S.C.

[21] Appl. No.: 903,026

[22] Filed: Jun. 23, 1992

[51] Int. Cl.$^5$ .............................. C08L 1/00; C08K 5/13
[52] U.S. Cl. ........................................ 524/35; 524/34; 524/72; 524/76
[58] Field of Search ................... 524/13, 34, 35, 72, 524/76; 428/327; 427/326

[56] References Cited

U.S. PATENT DOCUMENTS

| | | | |
|---|---|---|---|
| 2,247,208 | 6/1941 | Schorger | 524/13 |
| 2,329,570 | 7/1943 | Katzen et al. | 524/13 |
| 4,098,649 | 7/1978 | Redker | 201/2.5 |
| 4,111,730 | 9/1978 | Balatinecz | 428/903.3 |
| 4,339,363 | 7/1982 | Nakagima | 524/34 |
| 4,717,743 | 1/1988 | Wakabayashi et al. | 524/35 |
| 4,968,463 | 11/1990 | Levasseur | 264/40.1 |
| 5,008,310 | 4/1991 | Beshay | 524/13 |
| 5,096,945 | 3/1992 | Sun | 524/13 |
| 5,130,352 | 7/1992 | Chow | 524/13 |

FOREIGN PATENT DOCUMENTS 1369204 10/1974 United Kingdom ....... 264/DIG. 69

Primary Examiner—Paul R. Michl
Assistant Examiner—LaVonda DeWitt
Attorney, Agent, or Firm—Dority & Manning

[57] ABSTRACT

A fiber-reinforced thermoplastic composition for producing composite structural members and a method for making same is provided. The composition is made by combining a thermoplastic resin with pre-treated high moisture cellulosic materials, such as discarded newspaper, having lignin contained therein. Moisture treatment of the cellulosic materials exhibit improvements over composites using dry cellulosic materials. The composite composition may then be extruded or compression molded into various articles of manufacture.

32 Claims, No Drawings

PRE-TREATED CELLULOSIC MATERIALS FOR PRODUCING MOLDED COMPOSITE ARTICLES THEREFROM AND PROCESS

FIELD OF THE INVENTION

This invention relates to fiber-reinforced thermoplastic compositions employing moisture-treated cellulosic materials for producing composite materials as well as a method of making fiber-reinforced thermoplastic compositions and composites therefrom.

BACKGROUND OF THE INVENTION

In recent years, plastics and plastic composites have become increasingly important materials for making various types of articles. These thermoplastic-containing materials have begun replacing metals as structural members. Such thermoplastic materials offer outstanding mechanical properties, unique flexibility and design capabilities, and ease of fabrication. Additional advantages include their light weight, corrosion resistance, and affordable price. In fact, high-strength and lightweight thermoplastic composite materials are strongly demanded for various engineering applications. Such applications have included the use of thermoplastic composites in construction materials, flooring materials, and in fabricating furniture.

Recently, attention has turned to the possibility of manufacturing plastics with desirable mechanical properties by reinforcing the plastics with fibers. Such reinforcement adds strength to the composites without adding much weight. These fiber-reinforced structures exhibit excellent strength when molded into articles of manufacture like those discussed above.

In addition to the increasing demand for such fiber-reinforced thermoplastic composites to replace conventional structural materials, the shortage of facilities for disposing of solid wastes is rapidly growing. The largest portion of the wastes in the solid waste stream consists of paper and other cellulosic fibers, including textiles and wood. Plastics make up another large portion of the wastes. Among the cellulosic fiber wastes, a large portion of the fiber is discarded printed material, including newspapers. Of the remaining cellulosic fiber waste and plastics waste, a large portion consists of packaging materials. Many of these packaging materials, like the printed cellulosic materials, have ink printed thereon for advertising or other identification purposes. Accordingly, a very large portion of the solid waste stream consists of cellulosic fibers and plastics.

One prior art composite material, as shown in U.S. Pat. No. 3,956,541 to Pringle, uses particulate wood filler materials such as wood chips, comminuted paper and sawdust to reinforce a composite made from thermoplastic insulation found in scrap electrical wire and cables. The filler materials are held together with the thermoplastics by adding a phenolic resin binder such as urea-formaldehyde.

British Patent No. 1,369,204 issued to Paske shows a method of making a plastics product from a raw material having more than 85 percent by weight reclaimed synthetic thermoplastic material wherein the thermoplastic materials are compressed at pressures between 10 and 1,000 pounds per square inch (psi). The thermoplastic materials must be present in the composition at more than 85 percent by weight. The remaining 15 percent or less of the product may include small quantities of incidental constituents such as metal foil, cardboard, paper, paperboard, sawdust, and other garbage materials.

Other prior art structures, such as those disclosed in U.S. Pat. No. 4,810,445 to Lamb, Sr., et al. and U.S. Pat. No. 4,045,603 to Smith show laminated materials wherein a middle layer is formed by combining shredded 42-pound Kraft paper coated with polyethylene or other cellulose fiber products such as shredded tree bark with thermoplastics to form a thermoplastic layer having paper encapsulated therein. Such middle layers are then laminated between two paper webs in Lamb and between two hardened thermoplastic layers in Smith to ensure bonding of the cellulose particles.

U.S. Pat. No. 4,874,095 to Warych discloses package edge protectors that are not susceptible to attack by moisture. The protectors are formed under heat and pressure from paper-waste cuttings having an edge length of 2 to 5 mm and larger and low molecular weight thermoplastics. The final product results in a protector wherein the paper cuttings are encapsulated within the thermoplastic materials.

Other patents, such as U.S. Pat. No. 4,098,649 to Redker and U.S. Pat. No. 4,968,463 to Levasseur show processes for using waste stream materials, including paper, wood, and plastics. Redker discloses a process of destructively distilling organic waste material by an extruder. Levasseur discloses a process for producing extruded or molded objects formed from garbage materials including thermoplastics present in an amount of over 65 percent by weight and other garbage filler agents such as compost refuse, paper, rags, or materials extracted from other household wastes. The disclosed process requires that the water content of the waste products be less than three percent by weight.

Although the prior art shows a combination of thermoplastic materials and certain types of cellulosic materials, the particular features of the present invention are absent from the prior art. The prior art is generally deficient in affording a proper attachment between the thermoplastic resin and the cellulosic material to form a coherent member. The prior art has attempted to achieve such coherency but has had to employ specific binders, inordinate amounts of thermoplastic material, large pieces of cellulosic materials, or other materials acting as binding agents. The present invention, however, overcomes the shortcomings of the prior art in that a method is disclosed herein for forming a coherent mass of thermoplastic and cellulosic material.

A patent application directed toward an invention similar to that presently claimed is currently pending at the time this application was filed. That application, Ser. No. 07/692,004, filed on Apr. 26, 1991 by an inventive entity including the presently named inventor, is directed to a fiber-reinforced thermoplastic composition and molded composite articles made therefrom. The invention therein, however, is directed to cellulosic fiber-reinforced thermoplastic compositions wherein cellulosic fibers generally have a moisture content of from about 5 to about 7 percent by weight. That application is incorporated herein in its entirety by reference thereto.

SUMMARY OF THE INVENTION

It is an object of the present invention to provide a fiber-reinforced thermoplastic composition for producing composite materials.

It is another object of the present invention to provide an improved fiber-reinforced composition employing lignin to ensure that the fibers and thermoplastics result in a sufficiently coherent mass.

Still another object of the present invention is to provide a method for making fiber-reinforced thermoplastic composite materials.

Still another object of the present invention is to provide a means for utilizing waste cellulosic materials and waste thermoplastic materials in composite structures.

Yet another object of the present invention is to provide a process for creating articles of manufacture made from fiber-reinforced thermoplastic composite materials.

Still another object of the present invention is to provide a method of creating a high moisture content cellulosic material reinforced thermoplastic composition having enhanced properties.

It is another object of the present invention to provide cellulosic material pre-treated with water for use in thermoplastic compositions for producing composite materials.

Generally speaking, the present invention is directed to a composition used to produce composite materials and a method for making that composition, and/or the composites. The composition is made from thermoplastic resins such as homopolymers or copolymers of styrene, propylene, vinyl chloride or ethylene, or mixtures thereof. The thermoplastic resin is combined with cellulosic material to form a fiber-reinforced composite.

The composites formed may be made from either virgin materials or, preferably, materials recovered from or intended for the solid waste stream. In light of the decreasing supply of raw materials from which to make cellulosic materials and the abundance of cellulosic materials and thermoplastics in the waste stream, this invention fulfills a great need.

The overall properties of the fibrous composites made according to the present invention are controlled by the properties of the thermoplastics and cellulosic material employed, the quality of dispersion of cellulosic fibers into the thermoplastics, the fiber/thermoplastic interface, the moisture content of the materials employed, and the amount of cellulosic material used. The strength of the fibrous composite is generally dependent on the aspect ratio of the fibers and the ability of the fibers to be held with the thermoplastic resin in a coherent mass. The aspect ratio is a measure of the size of the fibers used to reinforce the composites and is determined by dividing fiber length by fiber diameter.

The cellulosic materials available for use in the present invention include papers, paperboards, newsprints, textiles, wood fibers, and any of the cellulose fibrous materials containing lignin therein. Preferably, the cellulosic materials are reclaimed from the solid waste stream or salvaged after being used for their original purpose. The cellulosic material preferably includes printed materials such as newspapers, magazines, and the like having lignin contained therein. Alternatively, lignin may be added as a separate component when the materials do not have lignin contained therein.

The cellulosic material is pre-treated by immersing same in water to achieve a high moisture cellulosic material having a water content of from about 10 to about 200 percent by weight. No defiberation or mechanical grinding or cutting of the cellulosic material is required. If sizing of the material is desired, this is done by grinding the fibers into a size so that they will pass through a 20 mesh sieve with the fibers having a length portion, as opposed to a diameter portion, smaller than the 20 mesh opening. If used, the preferred fibers also have an aspect ratio, which is a ratio of fiber length to fiber diameter, of greater than 20.

The thermoplastic resins are heated in a mixing device until a molten matrix is formed. The cellulosic materials are then gradually added to the molten matrix of thermoplastics while mixing is continued and a selected temperature is maintained. A substantially homogeneous mixture of cellulosic material and thermoplastic resin, wherein the materials are well-dispersed, is thereby obtained. This mixture is then formed, preferably by extrusion or compression molding, into a structural composite member.

Such structural composite members may take many shapes and forms. For example, materials made according to the present invention have usefulness in replacing metals in the building industry, in replacing wood in the furniture and construction industries, as well as being used for forming furniture, tiles, and various other structural materials. Advantages of structural materials made from the present invention include their light weight, corrosion resistance, and excellent strength. Compared to other thermoplastic materials, the fiber-reinforced materials of the present invention are superior in strength. Moreover, the components used in accordance with the present invention may be formed from materials obtained from the waste stream so that virgin materials are conserved. The present invention aids in solving the problem of disposing of today's wastes while creating new and useful structural materials.

DESCRIPTION OF PREFERRED EMBODIMENTS

A composition for production of composite materials is provided. Generically, this composition comprises a mixture of thermoplastic resin, cellulosic materials that have been moisture treated, and lignin. The lignin is present in an amount sufficient to cause the thermoplastic resin to form a coherent structural composite with the cellulosic fibers.

The thermoplastic resin present in the composition of the invention may be any thermoplastic. Thermoplastics are a well-known class of materials and include polyolefins (e.g., polyethylene, polypropylene, polybutylene), vinyls (e.g., polyvinyl chloride, polyvinyl acetate, and various vinyl polymers), polyamides (e.g., nylon), acrylic resins (e.g., polymethyl methacrylate) and styrene resins (e.g., polystyrene). The resin may be present as a homopolymer, a copolymer, or mixtures thereof and in any combination of the thermoplastic resins mentioned above.

The thermoplastic present in the composition is unimportant except with respect to its melting point. As explained below, the thermoplastic resin used to make the composition of the present invention is made into a molten matrix into which the cellulosic materials added. Some thermoplastic resins may have such a high melting point that addition of cellulosic material at that high melting point may cause the cellulosic material to burn or otherwise degrade. Accordingly, the thermoplastic resin utilized in making the composition of the present invention should be one in which a molten state of thermoplastic resin may be achieved and cellulosic material mixed therein without burning or otherwise degrading the fibers of the cellulosic material. Preferably, the thermoplastic resins are waste materials reclaimed from the solid waste stream or are salvaged waste materials which have been discarded and are intended for the solid waste stream. Virgin materials, of course, may be used.

The cellulosic materials present in the composition of the invention may be any material made from cellulose fibers. Such materials include papers, including newsprints, typing paper, book paper, magazine paper and all other papers, paperboard, wood fibers, including sawdust and pulverized wood, textiles, including rayons, cottons, ramie, bamboos, jute, bagasse, and any other materials having cellulosic fibers. Preferably, the cellulosic materials are waste materials reclaimed from the solid waste stream or are salvaged waste materials which have been discarded and are intended for the solid waste stream. Such products may include discarded newspapers, discarded packaging materials, discarded books, and discarded textile materials. In the most preferred embodiment of the present invention, the cellulosic material is obtained from discarded newspapers.

Although the precise theory behind the present invention is not known, an important component thereof appears to be lignin. The lignin is present in the composition in an amount sufficient to cause the thermoplastic resin and the cellulosic material to form a coherent mass. The lignin used in the present invention may be the lignin naturally occurring in the cellulosic materials and not previously removed (e.g., by dissolution and bleaching the fibers), or it may be added as a separate component to the composition when the cellulosic materials themselves do not provide the lignin. Preferably, because the cellulosic materials used in the present invention are usually obtained from waste materials, the lignin will be present in the material itself. Such preferred waste materials include discarded newspapers and other lignin-containing fibrous waste materials. The presence of ink within the cellulosic material or otherwise within the composition mixture does not hinder the formation of the composition described herein. In fact, it is speculated that ink may enhance the ability of the cellulosic material and the thermoplastic resin to form a coherent unitary mass.

The cellulosic materials are generally present in the composition of the present invention in an amount of from about 10 percent to about 60 percent by weight of the composition. A higher cellulosic content will result in a stronger fiber-reinforced composite and are included within the scope of the present invention. Although such higher fiber composites show increased strengths, the homogeneous mixture of thermoplastic resin and higher fiber concentration requires more energy which, at some point, could cause degradation of the thermoplastic.

Another important aspect of the present invention is the pre-treating process of saturating the cellulosic materials with moisture. The cellulosic materials are soaked in water until a moisture content of from about 10 percent to about 200 percent by weight is achieved. As used herein, moisture content, or water content, refers to the amount of water relative to the dry weight of the cellulosic materials used. The water content is determined by the following formula wherein CM indicates cellulosic material:

$$\text{water content (\%)} = \frac{\text{wet } CM \text{ wt.} - \text{dry } CM \text{ wt.}}{\text{dry } CM \text{ wt.}}$$

Alternatively, water may be added in connection with an alkaline agent such as sodium hydroxide, or the like, during treating of the cellulosic fibers. Such pre-treatment improves both the modulus and tensile strength of the fiber-reinforced thermoplastic composite.

The thermoplastic resin is generally present in the composition in an amount of from about 40 percent to about 90 percent by weight. The exact proportions of the components will vary depending on the strength of composite desired, the waste materials available and other parameters of the forming process. As described above, the thermoplastic resin may be present as a single type of thermoplastic resin, such as polypropylene alone, or may be a mixture of two or more types of thermoplastics, such as polyethylene, polypropylene, and polystyrene.

In addition, the thermoplastic resin matrix may include one or more additives that serve to enhance the compatibility between the thermoplastic and the cellulosic material. One such enhancing additive is maleic anhydride modified polypropylene which is obtainable from BP Chemicals under the tradename Polybond 300. It will appreciated that such additives are not necessary to the present invention, but may provide enhancing affects when employed.

The lignin present in the composition does not necessarily have to be provided on or within the cellulosic material. If desired, lignin may be added as a separate component to the composition so long as it is added in an amount sufficient to allow the thermoplastic resin and the cellulosic materials to be bound in a coherent unitary mass. The amount of lignin present should cause sufficient cohesiveness between the thermoplastic resin and the cellulosic materials to provide the strength required in making the particularly desired structural composite member. The amount of lignin required, either when added as a separate component or when supplied as part of the cellulosic material, may be determined easily by one of ordinary skill in the art. For example, data relative to the strengths of the composite materials formed from the present composition wherein the amount of lignin in the composition is varied would reveal the minimum and optimum amounts of lignin required.

The composition for producing composite materials of the present invention is preferably made as follows. Initially, the thermoplastic materials are collected and washed to remove any metallic or other undesirable matter. The desired cellulosic materials to be used in the composite are then collected and pre-conditioned with water. Particularly, the cellulosic material, such as newsprint is, immersed in a water bath containing a sufficient amount of water to render a cellulosic material having a moisture content of from 10 percent to about 200 percent. The preferred moisture content of the fibers is at least about 10 percent and most preferably between about 10 percent and about 50 percent by weight. As used herein, high moisture cellulosic material refers to a cellulosic material that has been treated with at least 10% by weight of the fibers.

In another embodiment, the pre-conditioned cellulosic materials may be ground to a size of about 20 mesh. The sizes of the cellulosic fibers may be such that the lengths of the fibers, as opposed to the diameters, are less than the width of an opening in a 20 mesh sieve. Furthermore, the cellulosic fibers sized during such grinding processes have aspect ratios greater than 20. The utilization of significant fibers with an aspect ratio of less than 20 can result in problems such as lack of strength and lack of cohesiveness. It will thus be appreciated that aspect ratios of less than 20 also fall within the present invention, even though the strength of such materials may be less than the strength of the material made in accordance with the preferred embodiment. Moreover, greater sizes and aspect ratios require more energy to disperse the fibers adequately within the mixture.

Those familiar with the art will also appreciate the fact that other instruments and other processes can be utilized when sizing the cellulosic material. For instance, the cellulosic materials may be cut, comminuted or pulverized to obtain the appropriate sizes. It will also be appreciated that other sizes of sieves will be used with fibers of other diameters to achieve an aspect ratio greater than 20.

A molten matrix of the chosen thermoplastic resin(s) is created by heating the thermoplastic resin in a mixer. In the hereinafter described examples, a C. W. Brabender Mixer-Measuring Heads with a computerized Plasti-Corder P. L. 2000 was employed as the intensive mixer. Mixer roller speeds are operated at a speed of 60 revolutions per minute (rpm) for 3 minutes. The selected thermoplastic mixture is softened to form the molten matrix by the heat supplied from the mixer's heater in addition to the heat generated by the mixing process.

After the cellulosic materials are pre-conditioned and the molten matrix of thermoplastic resin is prepared, the cellulosic fibers are gradually added to the molten matrix of thermoplastic resin with continued mixing. Processing at a temperature of 175° C. for a period of 37 minutes after addition of the fibers to the matrix is one set of processing parameters that may be employed. During mixing at such elevated temperatures, the moisture in the cellulosic materials is converted into steam and released. Other parameters, of course, will be available for preparing the composition.

The mixture may then be ground and compressed or extruded into the desired composite articles. The composite article formed from this process is then allowed to cool into its structural form.

The composite material formed according to the described method results in a cohesive fiber-reinforced thermoplastic material possessing excellent strength and other desirable mechanical properties.

The present invention may be better understood by reference to the following Examples.

EXAMPLE 1

The composition according to the present invention was prepared as followed. For this particular embodiment, a fiber-reinforced thermoplastic composite was formulated for comparison purposes by employing newspaper sheets that had not been pre-treated by the moisture-adding methods described herein. Newsprint that had not been treated according to the pre-soaking or presteaming procedures described herein was introduced in an amount of 14 grams into the intensive mixer described above. A temperature of 170° C. and a rolling speed of about 60 rpms was maintained for about 3 minutes. Fourteen grams of polystyrene, 14 grams of polypropylene, and 14 grams of polyethylene, by dry weights, were added to the mixer. Mixing and heating continued for an additional 37 minutes. After such mixing, the plastic/cellulosic material composite mixture was ground using a Wiley Mill to obtain a powder. The powder was compression molded into a dumbell-shaped specimen as follows. The compression mold was operated for ten minutes at atmospheric pressure at 380° F., then 548 psi was maintained at the same temperature for six minutes, after which time, six minutes of compression at 1096 psi was applied. The composite article was then cooled during a period of from about 10 to 15 minutes to about 100° F. and then to room temperature to achieve the fiber-reinforced thermoplastic composite article. In this example, the plastics and cellulosic material were each present in equal 25 percent amounts by dry weight.

After allowing the fiber-reinforced thermoplastic composites to cool, testing for strength and elastic modulus was conducted on an Instron Tensile Testing Machine. The particular comparison composite not employing pre-treated cellulosic materials made according to this Example 1 exhibited a maximum strength of 13.96 MPa, a percent strain at maximum load of 1.128 and an elastic modulus of 264 MPa.

EXAMPLE 2

Another composite material was formed according to the method of Example 1, except that the 14 grams of newsprint was pre-treated by soaking the newsprint in 14 grams of water for 30 minutes (100% moisture content). The resulting composite material exhibited a maximum strength of 15.62 MPa, a strain at maximum load of 1.233%, and an elastic modulus of 1753 MPa.

EXAMPLE 3

Another composite material was formed according to the method of Examples 1 and 2, except that the newsprint was presoaked with 28 grams of water for a period of 30 minutes prior to formation of the thermoplastic fiber reinforced composite (200% moisture content). The resulting composite material exhibited a maximum strength of 23.99 MPa, a strain at a maximum load of 1.51%, and an elastic modulus of 2031 MPa.

EXAMPLE 4

A composite material was prepared according to the method and process of Examples 1-3, except that the newsprint fibers were pre-treated using a 1 percent solution of sodium hydroxide in water. The amount of soaking material used was 14 grams as described in Example 2 above. The resulting composite formed thereby exhibited a maximum tensile strength of 22.16 MPa, a strain of 1.648%, and an elastic modulus of 2040 MPa.

EXAMPLE 5

A composite material was made according to the method of Example 4, except that the strength of the sodium hydroxide bath was 0.5 percent by weight sodium hydroxide. The composite material produced thereby exhibited a maximum tensile strength of 20.09 MPa, a strain at maximum load of 1.456%, and an elastic modulus of 1836 MPa.

EXAMPLE 6

In another aspect of the present invention, a thermoplastic/cellulosic material composite was produced using only polypropylene as the thermoplastic resin. In this particular example, a control composite consisting of defiberated newsprint that had been comminuted into pieces having aspect ratios of greater than 20 was utilized. After defiberation of the newsprint during soaking in water to obtain discrete cellulosic fibers, the defiberated fibers were dried to contain a moisture content of about 5 to about 7 percent by weight moisture as described in the co-pending application identified above. The amount of newsprint in this particular composite was 60 percent and the amount of polypropylene thermoplastic resin was 35 percent by weight. The molten matrix was formed as in Examples 1-5 and the defiberated newsprint was added thereto. In addition, a 5 percent, by weight, maleic anhydride modified polypropylene additive as described above was added to the matrix to obtain the thermoplastic/cellulosic material composite. The above tests were conducted on this particular control composite. The resulting tensile strength of the composite using dried, defiberated newsprint fibers was 27.92 MPa and the elastic modulus was 2396 MPa.

EXAMPLE 7

In this particular example, 60 percent by weight of newsprint that was not defiberated, but that was presoaked according to the method of Examples 1-5, and not dried according to the method of Example 6, was added to 35 percent by weight polypropylene. In addition, 5 percent, by weight, of the maleic anhydride modified polypropylene additive described above was added to the molten matrix to improve the compatibility between the polypropylene and the cellulosic material. The thermoplastic composites were formed as in Example 6. The resulting composite article exhibited a tensile strength of 37.60 MPa and an elastic modulus of 2410 of MPa.

EXAMPLE 8

Another thermoplastic composite was formed according to the method of Examples 6 and 7 wherein the composite was made from 30 percent, by weight, polypropylene and 60 percent by weight cellulosic materials. In this particular composite, the newspaper was presoaked with 200 percent water content and then fed into the intensive mixer. The newspaper sheets were not defiberated as in Example 6. In addition, this particular thermoplastic composite employed 10 percent by weight of the maleic anhydride modified polypropylene additive described above. The resulting thermoplastic composite article exhibited a tensile strength of 41.47 MPa and an elastic modulus of 2403 MPa.

EXAMPLE 9

Another thermoplastic composite employing 60 percent by weight newsprint and 20 percent by weight polypropylene was employed together with 20 percent by weight of the maleic anhydride modified polypropylene additive described above. The thermoplastic composite was formed according to the method of Example 8 and the resulting thermoplastic composite article exhibited a tensile strength of 52.30 MPa and an elastic modulus of 2220 MPa.

EXAMPLE 10

Another thermoplastic composite was formed using 60 percent by weight of cellulosic material and 35 percent by weight polypropylene. In this particular embodiment, the cellulosic material consisted of equal amounts of newspaper sheets, chemical wood fibers, and thermochemical fibers to comprise the cellulosic material portion. In addition, 5 percent by weight of the maleic anhydride modified polypropylene additive described above was added to the thermoplastic molten mixture. The tensile strength of the resulting thermoplastic composite article was 32.54 MPa and the elastic modulus was 2450 MPa.

Each of the fiber-reinforced thermoplastic materials exhibited excellent strength characteristics and other desirous mechanical properties.

It will be understood that the invention is not limited to the particular thermoplastic composites or processes described herein, nor the particular parameters or dimensions described therefor. It should also be understood that any fiber-reinforced thermoplastic composition equivalent to that described falls within the scope of the present composition. Preparation routes of the composites and compositions and process steps therefor are merely exemplary so as to enable one of ordinary skill in the art to employ the method and compositions described herein and used in according to the present process. It will also be understood that while the form of the invention shown and described herein constitutes preferred embodiment of the invention, this description is not intended to illustrate all possible forms of the invention. The words used are words used of description rather than of limitation. Various changes and variations may be made to the present invention without departing from the spirit and scope of the following claims.

What is claimed is:

1. A composition for production of composite materials comprising a thermoplastic resin, cellulosic materials that have been pre-treated with water such that said cellulosic materials have an initial moisture content of at least about 30 percent by weight, and lignin, said lignin being present in an amount sufficient to cause said thermoplastic resin and said cellulosic materials to form a coherent structural composite.

2. A composition as defined in claim 1 wherein said thermoplastic resin includes at least one member selected from the group consisting of homopolymers or copolymers of styrene, propylene, vinyl chloride and ethylene, and mixtures thereof.

3. A composition as defined in claim 1 wherein said newsprint includes scrap newspaper with ink printed thereon.

4. A composition as defined in claim 1 wherein said cellulosic materials contain lignin.

5. A composition as defined in claim 1 wherein said cellulosic materials comprise paper.

6. A composition as defined in claim 1 wherein said cellulosic materials have an initial moisture content of from about 30 percent to about 100 percent.

7. A composition as defined in claim 1 wherein said thermoplastic resin is obtained from scrap thermoplastic materials.

8. A composition as defined in claim 1 wherein said cellulosic materials are present in said composition in an amount from about 10 to about 60 weight percent.

9. A composition as defined in claim 1 wherein said cellulosic materials have an initial moisture content of from about 30 percent to about 200 percent.

10. A composition for producing composite materials consisting essentially of thermoplastic resin and high moisture cellulosic material wherein said cellulosic material comprises newsprint pre-treated with water, wherein said newsprint has an initial moisture content of at least about 30 percent.

11. A composition as defined in claim 9 wherein said newsprint is present in said composition in an amount of from about 10 to about 60 weight percent.

12. A composition as defined in claim 9 wherein said newsprint includes scrap newspaper with ink printed thereon.

13. A method of preparing a composition for use in a structural composite consisting essentially of the steps of:
providing pre-treated cellulosic materials that have an initial moisture content of at least about 30 percent by weight;
providing a molten matrix of thermoplastic resin;
adding said cellulosic materials to said molten matrix of thermoplastic resin and producing a generally homogeneous mixture thereof, said mixture further comprising a sufficient amount of lignin to cause said thermoplastic resin and said cellulosic materials to form a coherent mass.

14. A method of preparing a composition for use in a structural composite as defined in claim 13 wherein said cellulosic materials have an initial moisture content of from about 30 percent to about 200 percent.

15. A method of preparing a composition for use in a structural composite as defined in claim 12 wherein said cellulosic materials are obtained from paper.

16. A method of preparing a composition for use in a structural composite as defined in claim 14 wherein said paper includes newsprint.

17. A method of preparing a composition for use in a structural composite as defined in claim 12 wherein said lignin is carried on at least a portion of said cellulosic materials.

18. A method of preparing a composition comprising the steps of:
providing pre-treated lignocellulosic materials, said materials having an initial moisture content of from about 30 percent to about 200 percent by weight;
providing molten thermoplastic resin;
combining said materials with said molten matrix so that a substantially homogeneous mixture is formed; and
forming said homogeneous mixture into a structural composite.

19. A method of preparing a composition as defined in claim 17 wherein said cellulosic materials comprise newsprint.

20. A method of preparing a composition as defined in claim 17 wherein said molten thermoplastic resin includes at least one member selected from the group consisting of homopolymers or copolymers of styrene, propylene, vinyl chloride and ethylene, and mixtures thereof.

21. A method of preparing a composition for use in producing a composite comprising the steps of combining from about 40 to about 90 weight percent thermoplastic resin with from about 10 percent to about 60 percent by weight lignocellulosic materials, wherein said lignocellulosic materials have been pre-treated with water such that said lignocellulosic materials have an initial moisture content of at least about 30 percent by weight, at about 165° to about 175° C. for a period of about 40 minutes to fashion a substantially homogeneous mixture capable of being formed into a coherent composite, said materials having been obtained from presoaked newsprint.

22. A molded article of manufacture formed from a composition consisting essentially of a thermoplastic resin, cellulosic materials, wherein said cellulosic materials have been pre-treated with water such that said cellulosic materials have an initial moisture content of at least about 30 percent by weight, and lignin.

23. A molded article of manufacture as defined in claim 21 wherein said thermoplastic resin includes at least one member selected from the group consisting of homopolymers or copolymers of styrene, propylene, vinyl chloride and ethylene, and mixtures thereof.

24. A molded article of manufacture as defined in claim 21 wherein a portion of said cellulosic materials contain lignin.

25. A molded article of manufacture as defined in claim 23 wherein said cellulosic material containing lignin is newsprint.

26. A molded article of manufacture as defined in claim 21 wherein said article is extruded.

27. A molded article of manufacture as defined in claim 21 wherein said article is compression molded.

28. A method of preparing a composition for use in forming articles of manufacture comprising the steps of:
immersing a cellulosic material containing lignin in water to condition said materials and obtain pre-treated fibers having an initial moisture content of from about 30 percent to about 200 percent by weight;
providing a thermoplastic resin in a molten state; and
combining said material with said thermoplastic resin to form a substantially homogeneous mixture.

29. A method of preparing a composition for use in forming articles of manufacture as defined in claim 26 wherein said cellulosic material comprises newspaper.

30. A method of preparing a composition for use in forming articles of manufacture as defined in claim 28 wherein said thermoplastic resin is combined with said material at a temperature of about 165° C. to about 175° C. and mixed together therewith for about 40 minutes.

31. A method of preparing a composition for use in forming articles of manufacture as defined in claim 26 wherein said thermoplastic resin includes at least one member selected from the group consisting of homopolymers or copolymers of styrene, propylene, vinyl chloride and ethylene, and mixtures thereof.

32. A method of preparing a composition for use in forming articles of manufacture as defined in claim 26 wherein said thermoplastic resin is obtained from waste thermoplastic materials.

* * * * *

UNITED STATES PATENT AND TRADEMARK OFFICE
CERTIFICATE OF CORRECTION

PATENT NO. : 5,288,772
DATED : February 22, 1994
INVENTOR(S) : David N.-S. Hon

It is certified that error appears in the above-indentified patent and that said Letters Patent is hereby corrected as shown below:

Column 8, line 24 change "264" to --2264--

Signed and Sealed this

Twenty-ninth Day of September, 1998

Attest:

BRUCE LEHMAN

*Attesting Officer*        *Commissioner of Patents and Trademarks*